United States Patent [19]

Langen et al.

[11] Patent Number: 4,862,558
[45] Date of Patent: Sep. 5, 1989

[54] METHOD AND DEVICE FOR BONING MEAT PORTIONS

[75] Inventors: Christianus P. Langen; Johannes C. Langen, both of Cuijk, Netherlands

[73] Assignee: Langen Research B.V., Cuijk, Netherlands

[21] Appl. No.: 99,730

[22] Filed: Sep. 22, 1987

[30] Foreign Application Priority Data

Sep. 22, 1986 [NL] Netherlands ............... 8602388
Feb. 19, 1987 [NL] Netherlands ............... 8700418

[51] Int. Cl.⁴ ............................................. A22C 17/04
[52] U.S. Cl. ..................................... 17/1 G; 17/46
[58] Field of Search ............................. 17/1 G, 46

[56] References Cited

U.S. PATENT DOCUMENTS 3,866,271 2/1975 McNeil ..................... 17/1 G
4,577,369 3/1986 Langen et al. ............ 17/1 G X
4,674,151 6/1987 Ketels ....................... 17/1 G X

FOREIGN PATENT DOCUMENTS

2227826 11/1974 France ....................... 17/1 G

*Primary Examiner*—Willis Little
*Attorney, Agent, or Firm*—Fetherstonhaugh & Co.

[57] ABSTRACT

A method and device for boning meat portions, making use of two opposite pressing elements adapted to be moved to and from each other, wherein each pressing element comprising a recess provided with inserts, along the borderline of the recess each pressing element is provided with means to separate the meat material from the bone or bones, said separating means are following substantially the contour of the bones in the meat portion, for instance the front leg or shoulder portion of a pig, said recess in at least one of the pressing elements is provided with means for locking up or pressing the or each bone piece in length-wise direction thereof and at least one of the pressing elements is provided with gripper members for gripping at least one ridge of a bone; as a result the bone is held firmly in place in a well positioned manner during the meat extracting operation.

18 Claims, 6 Drawing Sheets

METHOD AND DEVICE FOR BONING MEAT PORTIONS

The invention relates to a method and device for boning meat portions, making use of two opposite pressing elements adapted to be moved to and from each other, wherein each pressing element comprising a recess provided with inserts. Along the borderline of the recess each pressing element is provided with means to separate the meat material from the bone or bones. Those separating means are following substantially the contour of the bones in the meat portion, for instance the front leg or shoulder portion of a pig. Such methods and device is for instance disclosed in applicants former application EU-A-0086020.

The invention has for its object to ameliorate the method and device for separating the meat from the bones without the risk of damaging or breaking the bones.

According to a first embodiment the invention is distinguished in that the recess in at least one of the pressing elements is provided with means for locking up or pressing the or each bone piece in length-wise direction thereof. In practice it turned out that the length of the bones in the meat portion to be pressed, is increasing, resulting in bone damage. Owing to the locking up means or press means, provided in the recess of the pressing elements, such variation in the length of the bone resulting bone damage is avoided.

According to a further embodiment of the invention at least one of the pressing elements is provided with gripper members for gripping at least one ridge of a bone. As a result the bone is held firmly in place in a well positioned manner during the meat extracting operation.

If the meat is removed from at least one cavity of the bone bounding the ridge by inserting one of the set of gripper members into the cavity, this gripper member is used for positioning and holding in place as well as for extracting meat. The meat present in the cavity is thus forced outward by the gripper member. A bone which is well positioned using the gripper members can easily be stripped of meat by being clamped between the gripper members on one side and a press element on the other.

A simple, extremely well functioning device, preferably has clamping jaws, pivoting or sliding relative to each other.

The set of gripper members is preferably forced by actuating means outside the pressing surface of a pressing element, whereby at least one stop member cooperating with a gripper member forces the gripper members away from each other.

The invention will be further elucidated in the description following hereinafter with reference to a drawing of several embodiments according to the invention, with associated pieces of meat for boning.

In the drawing:

FIG. 12 a sectional view like FIG. 2 of the lower and upper pressing elements, the cavity of which is provided with locking-up and/or pressing means.

FIG. 14 and 15 a sectional view like FIG. 12, detailing the upper pressing element as further embodiment and a bottom view of the upper pressing element in FIG. 4 respectively, FIG. 16 a sectional view of the upper pressing element like FIG. 4, provided with a loose insert as further embodiment of the locking-up means.

FIG. 17 a sectional view of a detail of the lower pressing element, provided with a further embodiment of the pressing means for pre-loading each bone-piece.

Figure 1:
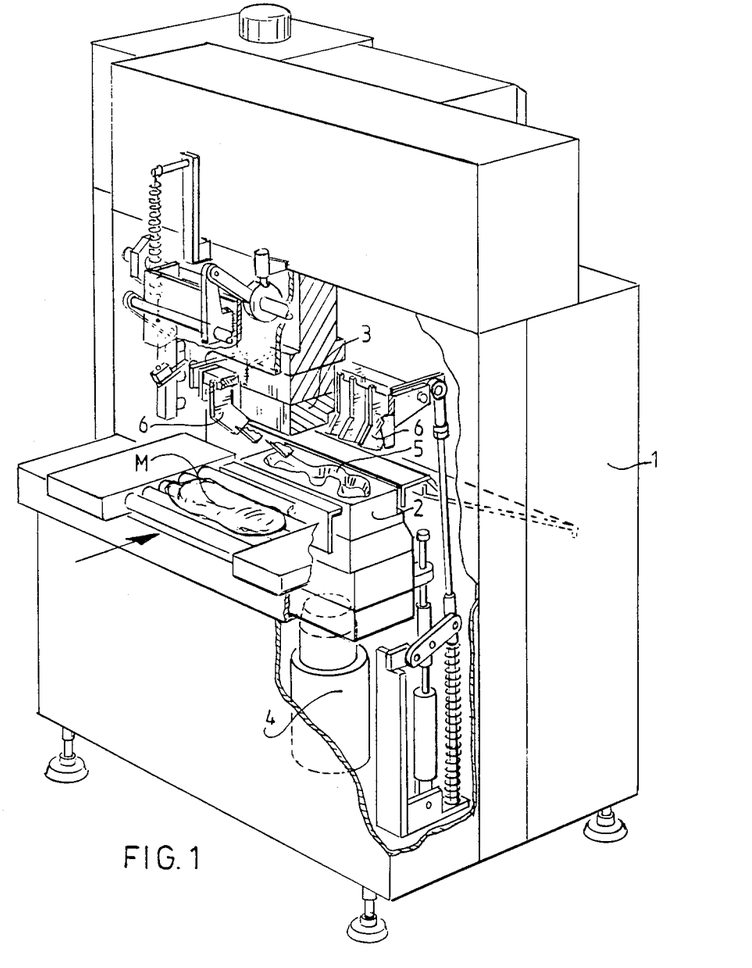
FIG. 1 shows a perspective view of a device for boning meat portions embodying the invention.

The boning device in FIG. 1 comprises a frame 1 of such a rigid structure to withstand high pressing forces between the lower and upper pressing element 2 and 3 respectively. The pressing elements 2 and 3 are arranged opposite to each other whereas the upper element 3 is rigidly suspended to the top side of the frame 1, whereas the lower element 2 is supported by a hydraulic cylinder 4 arranged in the lower part of frame 1. Due to the cylinder 4, the piston of which is movable in up- and downward direction, the lower pressing element 2 can be moved upwardly starting from the position as shown in FIG. 1.

Each element 3 is provided with a recess 5, which will be elucidated herebelow. The recess is adapted to receive the bone part in a meat portion M, which is to be deboned.

It is assumed that the operator will put the meat portion M on top of the lower pressing element 2, whereupon after actuation of the hydraulic cylinder 4 the pressing element 2 is urged to pressing element 3, so punching out the bone part from the meat portion M. After having lowered the pressing element 2, the bone parts are left in the recess 5, whereas the meat portion can be removed from between the pressing elements.

In order to have the bone part correctly placed near the recess 5, a plurality of members 6 are arranged in straddled relationship to the upper pressing element 3, said members urging the bone parts to the right position in between the lower and upper pressing elements 2 and 3. The working of said elements and the above mentioned device is disclosed in applicants earlier application as mentioned herebefore. It is noticed that in such a device the meat itself is not brought under pressure except for the bone part.

Turning now to the FIGS. 2-6, it is noticed that the recess 5 in the lower and upper pressing element 2, 3 is provided with inserts 7 and 8 respectively, of any suitable material. The pressing surface 9 of the inserts are cooperating such that the remaining space between the inserts when the lower and upper pressing element are pressed to each other will just receive the bone volume, such that all the meat material attached to the bone parts are urged outwardly.

Figure 2:
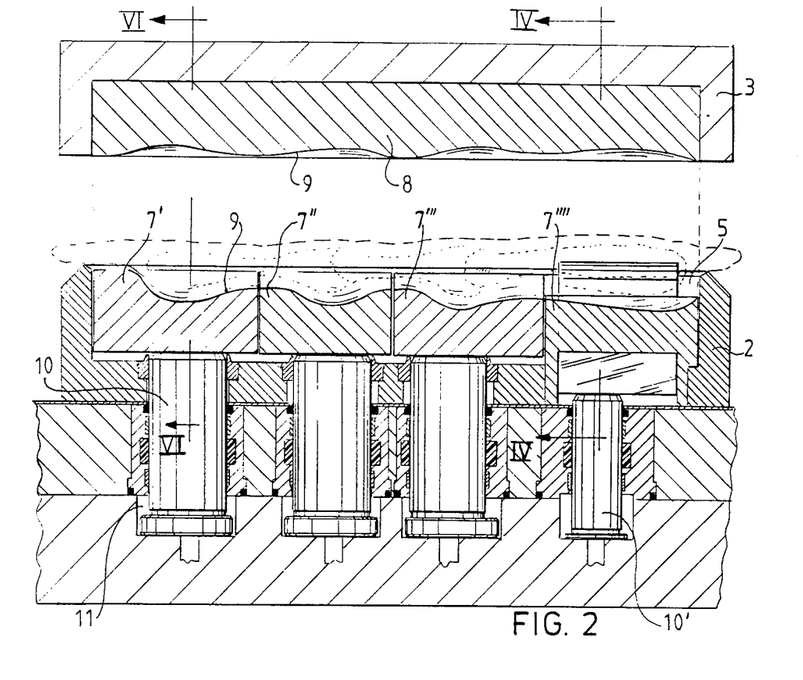
FIG. 2 shows a sectional view of the pressing elements of FIG. 1.
Figure 3:
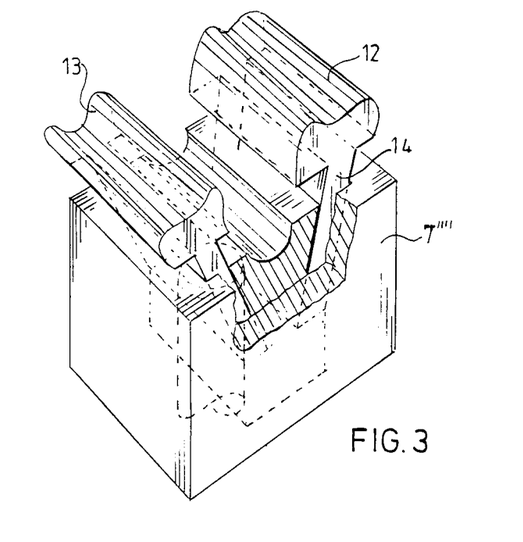
FIG. 3 is a partially sectioned perspective view of the bone gripper elements of FIG. 2.

In order to avoid damage to the bone parts, that is to say, splintering or fracture of the bones, the inserts 7 in the lower pressing element 2 may yield downwardly into the lower recess 5 of said element, which is possible by reason of the particular support in the form of a piston 10. The lower end of the piston 10 is protruding in a pressing chamber 11, which can be filled with a hydraulic pressure fluid. The pressure is such that a sufficient pressure can be exerted upon the bone but not so high that the bone will damage.

It is noticed that the inserts can be made of any suitable material such as flexible material, like rubber, but also metal, like copper etc.

The insert 7''''', right in FIG. 2, is not supported by a piston 10 as under the other inserts 7, but is supported without any yielding possibility in element 2.

Said insert 7''''' is nevertheless provided with a pair of gripping members 12, 13 showing a head portion and a shank portion 14. The shank portion is strip-like and fits into a guiding orifice of a rectangular cross-section formed in the insert 7'''''. The head portions of the gripper elements 12, 13 have a particular shape adapted to cooperate with one side of a bone portion, for instance a shoulder blade. Such a blade B is provided with a ridge 17 and adjacent cavities 15, 16, see also FIG. 4, 5.

Furthermore the shank portions 14 of both the gripping elements 12, 13 are oblique to each other, so when lowering the shank portions in the inserts 7''''', the head portions will converge each other; and when moving upwards the head portions will diverge.

In the embodiment shown in FIGS. 2-5, the gripping elements 12, 13 are supported by a piston 10' corresponding with the pistons 10 underneath the other inserts 7.

Figure 4:
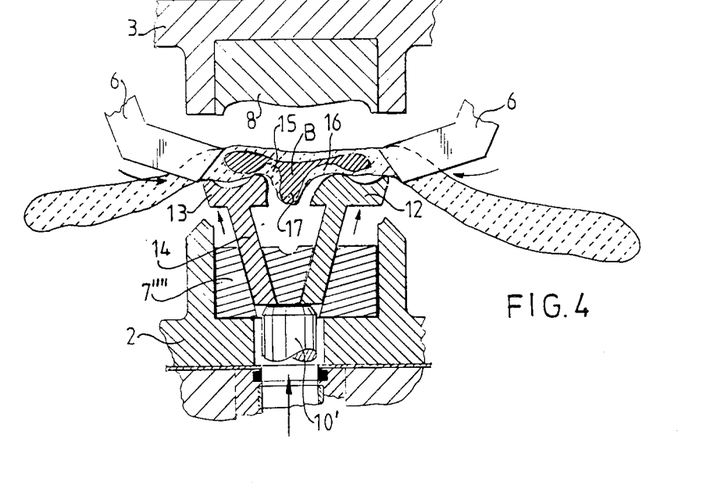
FIG. 4 and 5 a cross-sectional view according to IV—IV in FIG. 2, wherein the pressing elements are separated from each other or pressed to each other respectively.
Figure 5:
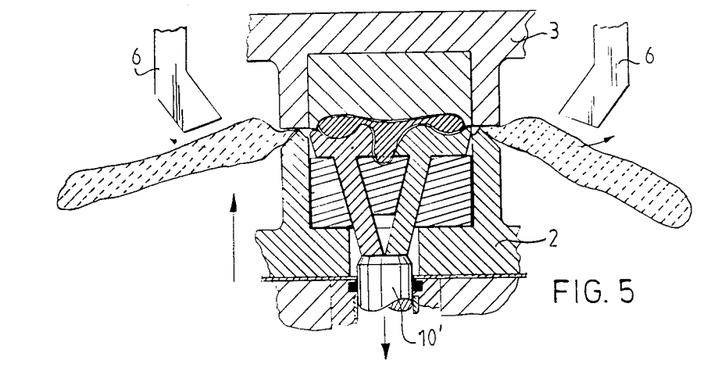
Figure 6:
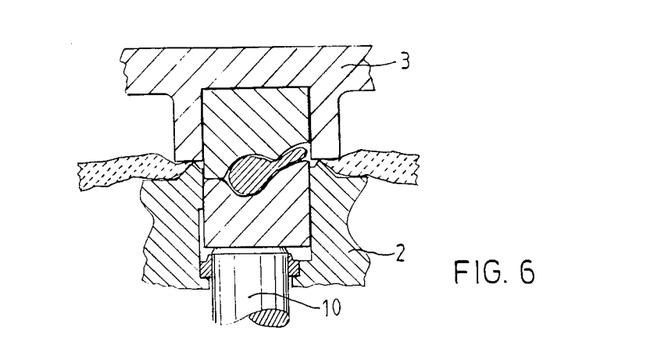
FIG. 6 a cross-sectional view according to VI—VI in FIG. 2.

As is clearly depicted in the FIGS. 4 and 5 the meat surrounding the shoulder blade B will be urged out of the cavities 15, 16 due to the profiled top surface of the head portions of gripping elements 12, 13, see FIG. 5. As soon as the meat is separated from the bone the pressing elements 2, 3 can be separated from each other to the position in FIG. 4, whereupon the piston 10' will urge the elements 12, 13 upwardly, so freeing the bone from the lower element. A next meat portion can be entered in between the lower and upper pressing element 2, 3 again, as is shown in FIG. 4.

Turning to the FIGS. 7-11 several alternatives of the gripping elements 12, 13 are elucidated. In the embodiment according to FIG. 7, 8 the upper press element 35 is suspended to hydraulic cylinder 36, whereas the lower pressing element is fixedly secured to a frame. Moreover the inserts are here embodied in rubber material 37.

Figure 7:
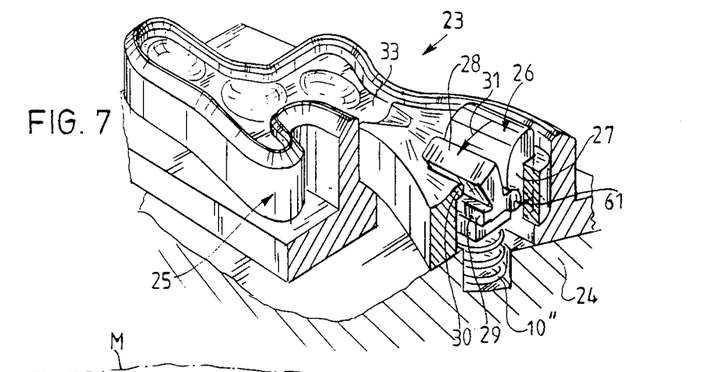
FIG. 7 shows on a larger scale a perspective view of a part of the lower pressing element provided with gripper members according to a second embodiment of the invention.
Figure 8:
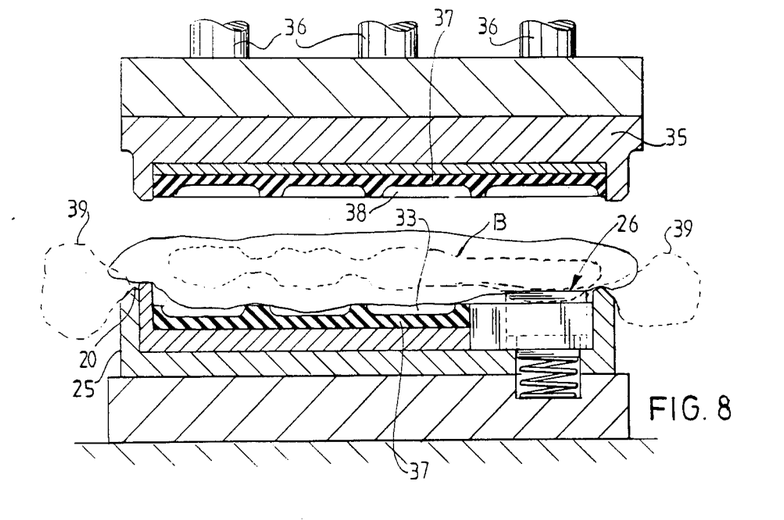
FIG. 8 shows a sectional view like FIG. 2 of the lower and upper pressing element according to the embodiment in FIG. 7.

The embodiment of the device 23 as in FIG. 7, 8 comprises a press frame 24 which has a lower press element 25. In press element 25 a clamp 26 is forced upward in vertical direction by a compression spring 10'' instead of the hydraulic cylinder. Clamp 26 consists of a non-pivoting gripper member 27 guided only in vertical direction in the press element 25 and a gripper member 28 which can pivot relative to gripper member 27 by means of a hinge 61. Gripper member 28 has a projection 29 which cooperates with a stop member 30 of press element 25. During upward movement of clamp 26 gripper member 28 pivots in arrow direction 31 as a result of projection 29 striking against stop member 30, this causing the clamp 26 to open. The position in FIG. 7, 8 is then reached. A piece of meat M can now be laid on press element 25, whereby the piece of meat M, in which a slight incision may or may not have been made beforehand, is placed with its ridge 17 into the opened clamp 26. The rest of the piece of meat M with the bone B shown therein is now placed into the recess 33 of the press element 25 adapted for the B. An upper press element 35 is then driven downward forcefully by means of hydraulic cylinder 36. Through deforming of the rubber 37 the bone B can be enclosed on all sides, so that virtually all the meat 39 with the exception of sinew is forced out of the press and is there cut off by means of a separating edge 20. It is noted that when the press is closed the clamp 26 is forced downward, as a result of which the gripper members 27 and 28 are forced towards each other, thereby clamping the ridge 9 tightly between them. Both gripper members 27 and 28 thereby penetrate into the cavities 15 and 16 on either side of ridge 9, so that the meat present there is pressed out. There is then created, as it were, a continuous upper surface of the press element 25 that is well adapted to the underside of bone B.

Figure 9:
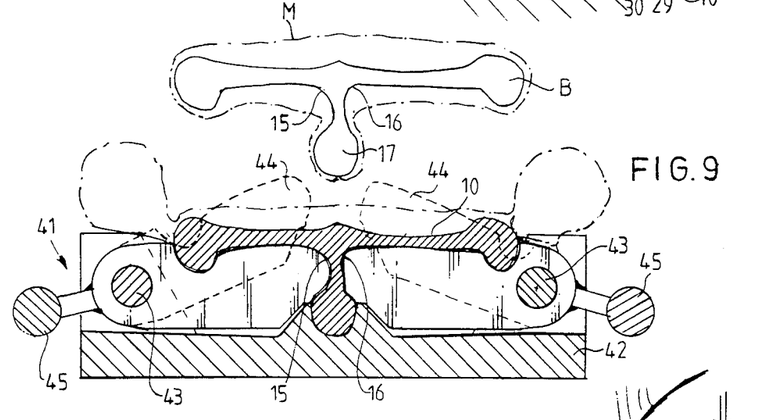
FIG. 9 is a cross-sectional view of gripping members according to a third embodiment of the invention.

With the device 41 in FIG. 9 a lower press element is formed by a frame 42 having two gripper members 44 therein which can pivot in shafts 43, which members form, in lifted position by means of counterweights 45, an opened clamp in which can be placed a piece of meat M. During downward movement the gripper members 44 pivot downward and then penetrate into the cavities 15 and 16 of bone B. The upper parts and edges of the gripper members 44 are adapted to the underside of bone B. The downward forcing can be carried out by means of an upper press element (not shown).

Figure 10:
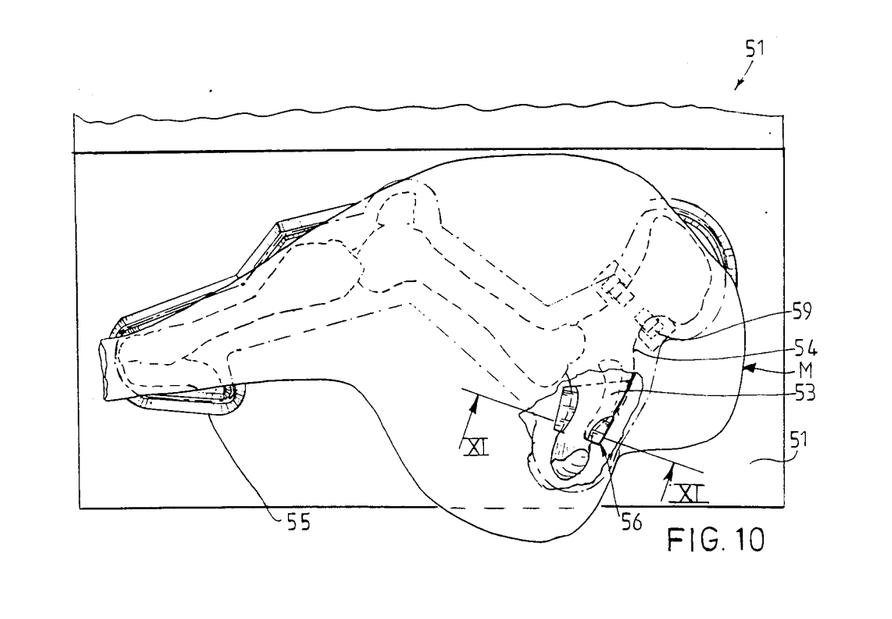
FIG. 10 shows a top view of a fourth embodiment of the invention.
Figure 11:
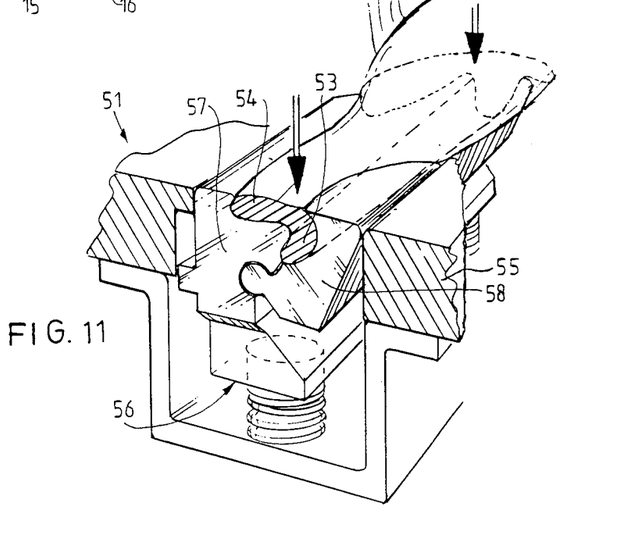
FIG. 11 shows on a larger scale a cross-sectional view along line XI—XI from FIG. 10.

The device 51 from FIG. 10 and 11 is adapted for boning a piece of meat M with an end bone 54 that has a ridge 53. With this device 51 the piece of meat 52 is positioned on a press element 55 by means of a clamp 56 with a vertically guided, non-pivoting gripper member 57 and gripper member 57 connected thereto for pivoting.

In addition, a simpler clamp 59 may be employed for good positioning of the end bone 54 and thereby the entire piece of meat M. A press element (not shown) placed above this and adapted to the upper surface of the bone can be moved downward in order to press out all the meat.

Figures 12, 14, 16:
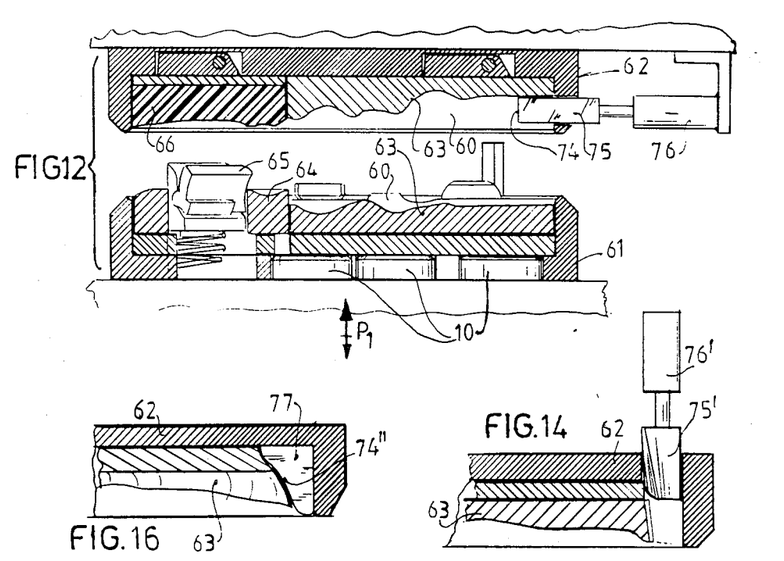
Figure 13:
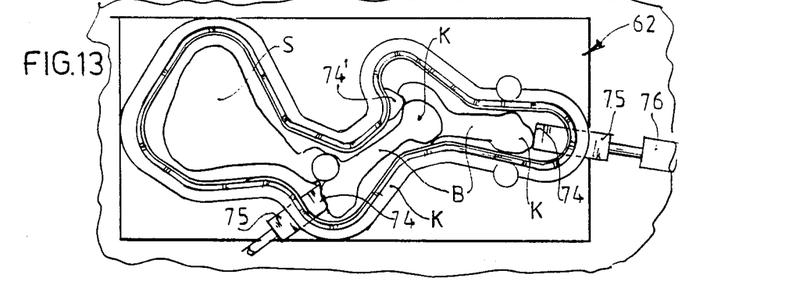
FIG. 13 is a bottom view of the upper pressing element in FIG. 12.

Turning now to FIG. 12 and 13, the embodiment here is also provided with particular inserts in the recess 60 of the lower pressing element 61 and upper element 62 respectively. Lower element 61 is movable in up- and downward direction according to arrow P1, what can be embodied by the cylinder 4 in FIG. 1.

The inserts as shown are partly of solid material, like metal 63, an insert 64 with gripping members 65 corresponding to the embodiment in FIG. 8, and yieldable material like rubber 66. The insert 63 in the lower pressing element 61 is supported by the pistons 10.

As is clearly depicted in FIG. 13 the group of bones B are hingedly connected to each other, whereas the left portion in FIG. 13 is the so-called shoulder blade S.

According to the invention the recess in both the pressing elements are provided with stop faces 74, which are formed here by the head end of a stub 75, protruding into the recess 60.

Said stop face may also be a fixed part of the inner wall of the recess of the pressing element, see for instance at 74'. However the stop faces are located such there where the head ends K of a bone B is laying in the recess, whereby the bone is locked-up in length-wise direction.

The middle-bone in FIG. 13 is solely supported at one side by a face 74, since due to its configuration the bone is supported in the hinge of the bone at the right side, so it will be locked-up sufficiently.

Furthermore it will be noted that in the embodiment as shown in FIG. 12 and 13 the upper pressing element is provided with such stop surfaces 74, 74', since the inserts 63 have such dimensions that in the closed position of the upper and lower pressing elements the bone will be received substantially in the upper pressing element.

The advantage obtained by the stop faces 74, is that yielding inserts 63 can be avoided easily, whereupon those inserts may be made in harder material, for instance stainless steel. Having an adapted contouring surface of the inserts, the bone will be enveloped rather accurate, and even when using high pressing forces the bone will be a bit deformed, but will not be damaged or fractured. Within the scope of the invention it is possible to provide the stub 75 with an actuating system 76, so being able to bring the stub 75 more or less far protruding in the recess and also the related stop face 74. It is also possible to urge a certain pressure upon the bone in length-wise direction by means of the system 76, so compensating even in high pressing forces of the pressing element 61, 62 a possible length variation of the bone.

The actuating system 76 can be hydraulic, pneumatic or mechanic and it can fully be removed when the stub 75 has the form of a screw-bolt. When rotating the bolt is a threaded hole in the wall of the upper element, the face 74 can be brought more or less into the recess thereof.

The reciprocating movement of the stub 75 can be effected before the meat portion M with including bones are laid upon the lower pressing element, but it can also be effected when the pressing elements are urged almost to each other, when a certain pressing force upon the bone piece is already available. In that case the hydraulic cilinder 76 can be actuated in order to bring the stub 75 and of course the stop face 14 against the head end of a bone in order to obtain the desired compensation force for diminishing the increase of length of the bone piece.

Figures 15, 17:
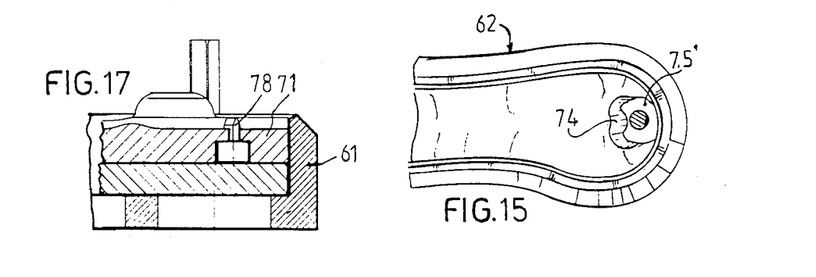

In the next embodiment according to FIGS. 14 and 15 the stub 75 may have another position with respect to the element 62. FIG. 14 shows an orifice in the upper pressing element 62 to receiving a stub 75', which is more or less protruding into the recess of the pressing element by means of a corresponding actuating system 76'. The cylindrical surface of the stub 75', here indicated with 74, serves as pressing surface which will contact the head end K of a bone B. The surface is inclined with respect to the direction of movement of the stub 75' in order to preload the bone piece more when the stub 75' is protruding more into the recess of the pressing element.

FIG. 16 shows a exchangeable insert 77, the surface 74" of which facing the recess of the upper element 62 is also inclined, so when moving the pressing element against each other, the bone portion in the recess of the upper element 62 is preloaded in length-wise direction since the surface 14" compresses the head end of the bone B. Owing to the inclination of the surface 74" it will happen that when urging the bone piece more in the upper element 62, the preloading upon the head end of the bone B will raise, what will diminish the increase of the length of the bone, so avoiding damage.

The insert 77 is dependent upon the average bone form and is to be exchanged by other inserts, in order to obtain the optimum preloading upon the head end of the bone. This is dependent upon the experience and the skill of the operator.

A fourth embodiment of a lock-up member for the head end of a bone piece is depicted in FIG. 17, wherein a ridge 78 is arranged in the insert 71, its knife-like edge protrudes from said insert. The location of the ridge 78 is near the outer extremity of the insert 71 and so near the head end of a bone B. This knife-like ridge will carve into the bone when closing the pressing elements and in this manner a displacement of the head end is prevented and therefor the increase of the bone length.

Also in this way there will be generated a force acting upon the bone, so preventing fracture of said bone.

The invention is not limited to the embodiments as described hereabove and as shown in the drawings.

What is claimed is:

1. In a press for removing a bone from a piece of meat of the type wherein the bone has a ridge portion which projects outwardly from one side thereof, the press having a pair of oppositely disposed pressing elements which are mounted for movement toward and away from one another, the improvement of;

gripper means on one of said pressing elements for releaseably gripping said ridge to secure the bone with respect to said one pressing element to prevent movement of the bone as the pressing elements close to remove meat from the bone, said gripper means comprises a pair of gripper elements which have a bite formed therebetween and wherein at least one of the elements is movable relative to the other to open and close the bite.

2. A press as claimed in claim 1, for use in association with a meat bearing bone of the type which is formed with at least one cavity extending along one side of the ridge portion thereof into which meat extends, the further improvement wherein the gripper means is adapted to conform to the configuration of said cavity and is operable to expel the meat from the cavity as the gripper elements move to the closed position in use.

3. A press as claimed in claim 1, wherein the gripper elements are movable relative to the pressing element which is disposed toward the ridge portion of the bone in use.

4. A press as claimed in claim 1, wherein the gripper elements are pivotally mounted for movement with respect to one another.

5. A press as claimed in claim 1, further comprising drive means associated with said pressing elements for driving the gripper elements to and fro between said open and closed positions.

6. A press as claimed in claim 1, further comprising means normally urging said gripper elements to said open position and stop means for limiting the movement of the or each movable element to limit the extent to which the elements may open.

7. A press as claimed in claim 1, wherein each of the pressing elements has a bone retaining recess formed therein and a meat severing ridge defining the perimeter of the recess, said gripping means being located within the perimeter of said bone retaining recess.

8. In a press for removing a bone from a piece of meat, the press having pressing elements which are mounted for movement toward and away from one another along a first path, the press elements having oppositely disposed pressing faces which have bone retaining recesses formed therein and a meat severing means extending about the perimeter of the recess, the improvement of;
    a pair of bone gripping members carried by a first of said pressing elements, said bone gripping members being mounted to extend into the bone retaining recess of said first pressing element and being moveable with respect to one another in a direction which is perpendicular to said first path to grip a bone to retain it against movement relative to said pressing elements as they are moved toward and away from one another to remove a bone from a piece of meat in use.

9. In a press for removing a bone from a piece of meat wherein the bone is longitudinally elongated, the press having pressing elements which are mounted for movement toward and away from one another, the pressing elements having oppositely disposed pressing faces which have bone retaining recesses formed therein, the improvement of bone retaining means mounted for movement in at least one end of one of said recesses, and means for moving said retaining means into engagement with a bone when a bone is located therein in use for securing a bone against longitudinal extension within said cavity in response to the compressive loads which are applied to the bone during meat removing compression in the press.

10. In a press for removing a plurality of longitudinally elongated bones from a piece of meat, the press having pressing elements which are mounted for movement toward and away from one another, the pressing elements having oppositely disposed pressing faces which have bone retaining recesses formed therein, the improvement of bone retaining means slidably mounted in at least one of said recesses of a first of said pressing element for movement with respect to said first pressing element, and drive means for driving the bone retaining means to and fro between first and second positions to secure each bone against longitudinal movement so as to lock the bone within the bone retaining recesses.

11. A press as claimed in claim 10, wherein a plurality of bone retaining means are mounted in said recess.

12. A press as claimed in claim 11, wherein the bone retaining means comprises stop means in said recess arranged to bear against opposite ends of the bones which are to be retained therein.

13. A press as claimed in claim 11, wherein said stop means is movable with respect to its associated pressing means so as to be adjustable to apply a preload longitudinal compression to one end of a bone before the pressing elements close.

14. A press as claimed in claim 1, wherein said stop means has an end face directed toward an end of a bone in use, said stop face being angularly inclined with respect to the direction in which the pressing elements close so as to apply a progressively increasing compressive load to the bone as the pressing elements move toward their closed position.

15. A press as claimed in claim 10, wherein the stop means comprises a ridge which protrudes from one of the pressing elements, said ridge having a knife-like edge arranged to bear against a bone to secure the bone against longitudinal movement with respect to the pressing elements in use.

16. A method of removing a bone from a piece of meat wherein the bone has a ridge portion which projects therefrom and wherein the piece of meat in which the bone is located is positioned between a pair of oppositely disposed pressing elements which are mounted for movement toward one another to separate the bone from the meat as they close, the pressing elements having bone accommodating recess, the improvement wherein;
    the ridge portion of the bone is gripped by gripper means carried by one of said pressing elements for movement with respect said one pressing element laterally inwardly of its bone accommodating recess so as to hold the ridge fast with respect to said one pressing element as the pressing elements close.

17. A method as claimed in claim 16, wherein the bone is formed with at least one cavity extending along one side of the ridge thereof into which meat extends, the further improvement wherein said gripping means is operable to expel the meat from said cavity as the gripper means moves laterally into engagement within said ridge.

18. A method as claimed in claim 16, wherein the bone from which the meat is to be removed has a main body portion which has first and second oppositely disposed side faces, said ridge projecting from one of said side faces and wherein the gripper means grips the ridge and is located at said first side of said main body and the other of said pressing elements is arranged to bear against said second side face of the bone.

* * * * *